United States Patent [19]

Kreczko et al.

[11] Patent Number: 5,123,677
[45] Date of Patent: Jun. 23, 1992

[54] ALL PLASTIC QUICK-CONNECT COUPLING

[75] Inventors: Gregory Kreczko, Hudson; Richard J. Medvick, Shaker Heights; Ross L. Wagner, Akron, all of Ohio

[73] Assignee: Swagelok-Quick Connect Co., Hudson, Ohio

[21] Appl. No.: 531,852

[22] Filed: May 31, 1990

[51] Int. Cl.⁵ .............................................. F16L 35/00
[52] U.S. Cl. ..................................... 285/24; 285/320; 285/331; 285/423; 285/921
[58] Field of Search ................. 285/320, 331, 24, 423, 285/921

[56] References Cited

U.S. PATENT DOCUMENTS

| | | | |
|---|---|---|---|
| 418,513 | 12/1889 | Hackley | 285/320 X |
| 4,444,419 | 4/1984 | Maeshiba | 285/320 X |
| 4,775,173 | 10/1988 | Sauer | 285/320 X |

Primary Examiner—Dave W. Arola
Attorney, Agent, or Firm—Fay, Sharpe, Beall, Fagan, Minnich & McKee

[57] ABSTRACT

A coupling assembly entirely formed from plastics material is provided for selectively connecting and disconnecting first and second fluid lines. A male coupling member includes an external groove that receives a radially inward extending shoulder of the sleeve. An external groove on a female coupling member is selectively engaged by latching tabs extending radially inward from the sleeve. The latching tabs are selectively pivoted radially outward through depression of release buttons. The pivoting action of the latching members is defined along a central portion in which circumferential strips undergo a twisting action.

17 Claims, 3 Drawing Sheets

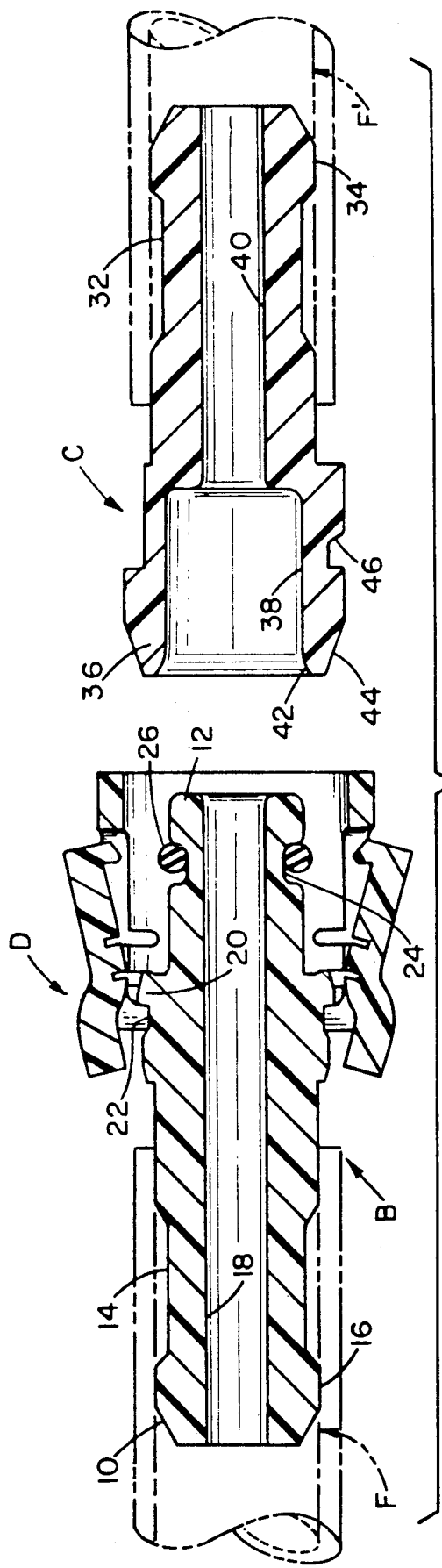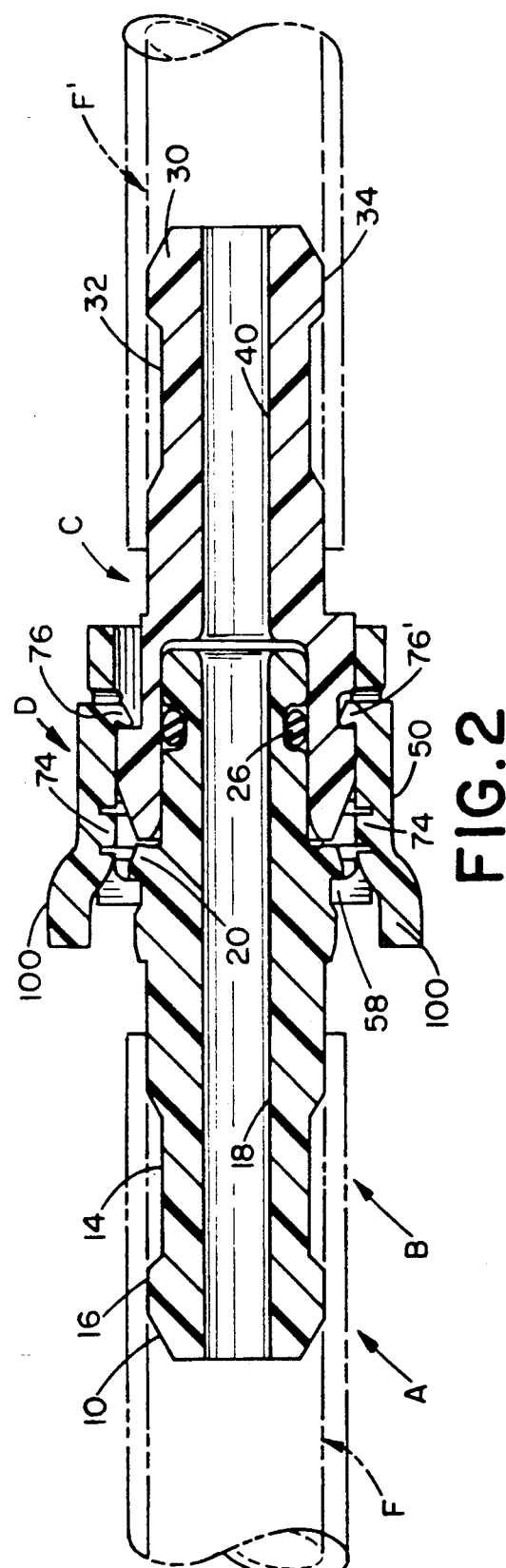

ALL PLASTIC QUICK-CONNECT COUPLING

BACKGROUND OF THE INVENTION

This invention pertains to the art of couplings and more particularly to quick-connect/disconnect couplings for fluid lines.

The invention is particularly applicable to a plastic quick-connect coupling particularly useful in the biotechnological and biomedical fields and will be described with particular reference thereto. However, it will be appreciated that the invention has broader applications and may be advantageously employed in other environments and applications.

Plastic quick-connect/disconnect couplings are known in the art in which a latching member is selectively pivoted to release and lock male and female coupling members that are connected to first and second fluid lines. Oftentimes, these known coupling assemblies incorporate metal stiffeners to provide rigidity and strength to the latching members that receive the stresses required to move between locked and unlocked positions. Otherwise, repeated and continued use of the latching members may result in permanent deformation so that the latch members do not effectively return to their unbiased state. This, in turn, can result in a reduced latching force that can be inadvertently overcome.

When handling biotechnological materials, it is necessary to maintain an ultra-clean environment that will not adversely react with the fluid material. Thus, use of any metal components is avoided. Unfortunately, many of the desired properties of known fluid coupling assemblies are not available in plastic coupling assemblies.

Still another goal in designing coupling arrangements is that the latching arrangement be simple and easy to use. In an effort to overcome some of the problems associated with prior plastic quick-connect couplings, manufacturers have designed complex latching arrangements that are difficult to manufacture and use.

It would be desirable, therefore, to provide a plastic quick-connect coupling that is easy to manufacture, assemble and use, made entirely of plastic, and that provides consistent latching action.

SUMMARY OF THE INVENTION

The present invention contemplates a new and improved quick-connect assembly that overcomes all of the above referred to problems and others and provides a simple, effective latching arrangement.

According to the present invention, the coupling assembly includes male and female members attached to first and second fluid lines, respectively. Each coupling member includes a circumferential groove preferably disposed at one end. A cylindrical sleeve member includes a radially inward extending shoulder received in the groove of either the male or female coupling member. A latching member is integrally formed in the sleeve and pivots along a central portion. A latching tab defined at one end of the latching member is selectively received in the groove of the other of the male and female coupling members.

According to a more limited aspect of the invention, the latching member includes circumferentially extending strips that are subjected to twisting forces upon pivoting action of the latching member.

According to yet another aspect of the invention, the sleeve is circumferentially continuous at one end and adapted to receive both the male and female coupling members therein.

According to yet another aspect of the invention, all of the coupling components are made entirely of plastic.

A primary advantage of the invention is the effective latching arrangement to selectively connect and disconnect separate fluid lines.

Yet another advantage of the invention resides in the ease with which the latching member is actuated.

A still further advantage of the invention is found in the applicability to the bio-tech environment.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 1 is a longitudinal cross-sectional view of the coupling components in a disconnected arrangement;

FIG. 2 is a longitudinal cross-sectional view similar to FIG. 1 but illustrating the coupling components in a connected arrangement;

DETAILED DESCRIPTION OF THE PREFERRED EMBODIMENT

Figure 7:
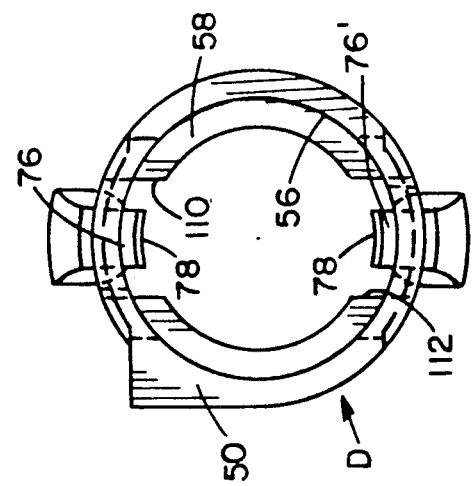
FIG. 7 is an elevational view taken from the right-hand side of FIG. 5.

Referring now to the drawings wherein the showings are for purposes of illustrating the preferred embodiment of the invention only and not for purposes of limiting same, the FIGURES show a coupling assembly A which includes a male coupling member B and a female coupling member C. A coupling sleeve D is fixedly secured to one of the coupling members, which in the preferred embodiment is the male coupling member, and selectively connects the male and female coupling members together.

More particularly, and as shown in FIGS. 1, 2, and 8-12, the male coupling member B is formed entirely of plastic, for example polysulfone. A first end 10 of the male coupling member is adapted for receipt in a first fluid line F which is illustrated in phantom. A second end 12 of the male coupling member is received in the coupling sleeve D and adapted for selective connection with the female member as will be described below. A reduced diameter region 14 and raised land 16 at the first end are adapted to securely receive the first fluid line thereover. An external clamping means (not shown) can be used to maintain a secure fit between the first fluid line and the male coupling member in a manner well known in the art. Since the clamping arrangement forms no part of the subject invention, further discussion herein is deemed unnecessary. The coupling member includes a through opening or bore 18 for fluid passage therethrough. The bore may include valving means (not shown) to selectively shut off fluid flow if desired, particularly when the male and female coupling members are disconnected.

Adjacent the second end of the male coupling member are a shoulder 20 and external groove 22. The shoulder and groove cooperate with the coupling sleeve to fixedly secure the sleeve and male coupling member together as will be described in further detail below. A second, reduced diameter groove 24 is disposed between the shoulder and second end. The second groove 24 receives a seal member such as O-ring 26 therein. The O-ring is sized so that its inner diameter closely grips the second groove while its outer diameter, in an uncompressed state, extends radially outward from the second end of the male coupling member. Thus, and as is more apparent in FIG. 2, when the coupling assembly is made up, the O-ring is radially compressed and axially expands to substantially fill the second groove 24. This assures a tight, secure seal between the male and female coupling members.

The female coupling member also includes a first end 30 adapted for receipt in a second fluid line F'. As similarly described with respect to the male coupling member, a reduced diameter region 32 and raised land 34 are adapted to tightly secure the female coupling member in the second fluid line. Again, an external clamping member (not shown) can be used to secure the fluid line to the female coupling member.

A second end 36 of the female coupling member includes an enlarged counterbore 38 that is coaxial with throughbore or passage 40. Preferably, the counterbore includes an internally tapered region 42 at its outer end that facilitates receipt of the female coupling member over the external diameter of O-ring 26. The tapered region ramps the female coupling member over the O-ring and facilitates insertion over the second end 12 of the male coupling member. An external tapered surface 44 is also provided at the second end of the female coupling member for reasons which will become more apparent below.

An external groove 46 is defined adjacent the second end of the female coupling member. This external groove facilitates locking connection of the coupling members. As best illustrated in FIG. 2, the groove is axially spaced from the end of the female coupling member so that sealing engagement is first established between the coupling members B, C. Thereafter, and upon further axial advancement of the coupling members from the position shown in FIG. 1 to that shown in FIG. 2, the coupling sleeve engages the groove 46. Fluid communication is then established between the bores 18, 40.

With continued reference to FIGS. 1 and 2, and additional reference to FIGS. 3–7, the third component of the coupling assembly, namely the coupling sleeve D, will be described in greater detail. It, too, is also formed entirely of plastic, preferably polysulfone. It will be understood, though, that still other alternative plastic materials can be used without departing from the scope and intent of the subject invention.

The coupling sleeve is defined by a substantially cylindrical member 50 having opposed first and second ends 52, 54 thereof. Preferably, the second end 54 is circumferentially continuous to provide added strength to the coupling assembly. The first end 52, on the other hand, has circumferentially interrupted regions for reasons which will be addressed below. The internal diameter 56 of the sleeve is dimensioned to freely, but closely, receive the second end of the female coupling member. Additionally, a radially inward extending shoulder 58 is disposed at the first end 52 of the sleeve and has an inner diametrical dimension substantially the same as that of external groove 22 on the male coupling member. In this manner, the sleeve can be inserted over the first end 10 of the male coupling member and advanced axially toward the second end 12 until the shoulder 58 snaps into engagement in groove 22. The shoulder 58 of the coupling sleeve abuts radially outward extending shoulder 23 of the male coupling member to limit further axial advancement of the sleeve toward the second end 12.

Figure 5:
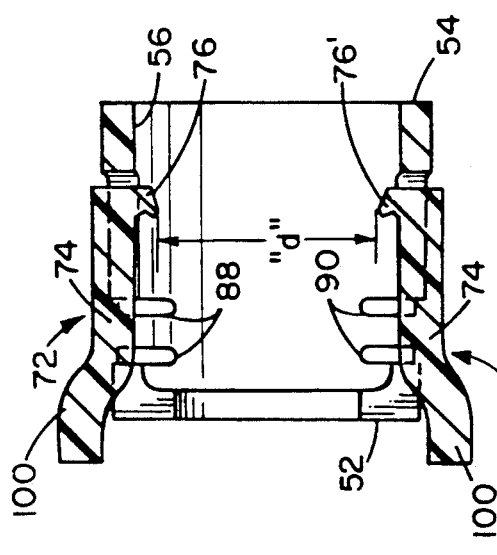
FIG. 5 is a longitudinal cross-sectional view of the coupling sleeve.

A means for latching the female coupling member to the male coupling member is integrally defined on the sleeve. More specifically, the latching means is defined by two, diametrically opposed latching members 72, 72'. The latching members are identical in construction so that description of one is applicable to the other unless specifically noted otherwise. The latching member pivots about a generally central portion 74. A latching tab 76 is defined adjacent the second end of the sleeve and extends radially inward so that the dimension "d" defined between the latching tabs 76, 76', in a relaxed position, is substantially less than that of the inner diameter 56 of the sleeve (FIG. 5).

Each latching tab includes a bevelled edge 78 that cooperates with externally tapered region 44 at the second end of the female coupling member to ride over and snap radially inward into groove 46. That is, as the male and female coupling members are brought into sealing engagement, the latching tabs slide along the tapered region 44 and then snap radially inward into groove 46. This locks the female coupling member against axial movement relative to the male coupling member.

Figure 3:
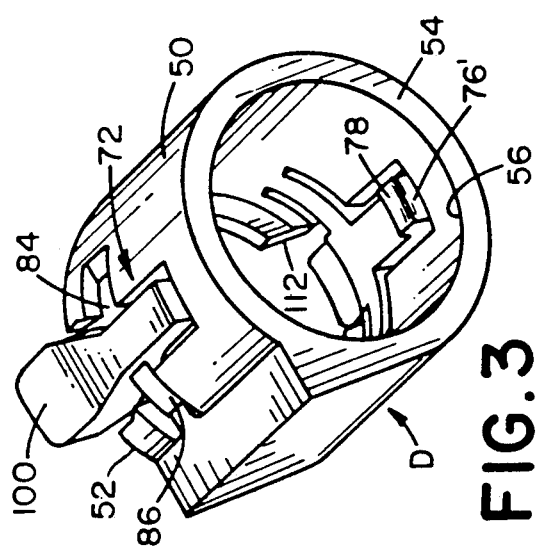
FIG. 3 is a perspective view of the coupling sleeve of the quick-connect assembly.

As the latching tabs slide over the external tapered region 44, the entire latching member pivots about the central portion 74. More specifically, circumferentially extending strips 84, 86 are defined by circumferential slot pairs 88, 90. The strips only extend partially around the circumference of the coupling sleeve as is apparent in FIGS. 3 and 4. One of the circumferential slots 88 intersects longitudinal slot 92 on one side of the strip 84 while the other slot intersects an irregular longitudinal slot 94 that extends to sleeve end 52. Likewise, circumferential slots 90 intersect longitudinal slots 96, 98 on either axial side of the strip 86. According to the preferred arrangement, and as best shown in FIG. 3, the circumferential strips have a substantially reduced thickness or radial dimension relative to the remainder of the sleeve. This provides ideal twisting action with sufficient reinforcement at the areas of intersection of the strips with the rest of the sleeve.

The longitudinal slots 94, 98 extend radially through the cylindrical member 50 at the first end 52 so that an actuating portion or release button 100 can be depressed radially inward relative to the sleeve. Depressing the buttons radially inward pivots the latching tabs 76 radially outward. This pivoting action places the circumferential strips 84, 86 under a twisting load, which is distributed along the strips to prevent plastic deformation of the sleeve material.

The latching member is reinforced along its longitudinal extent and as most apparent in FIGS. 3 and 5. The latching member has increased mass for strength and rigidity purposes so that depression of the release button results in a well defined pivoting action about the central portion 74 and circumferential strips 84, 86 to move the latching tabs to a release position. Once the depression force is released, the memory of the plastic material urges the latching tabs radially inward and the release buttons 100 radially outward to the normal, locked position shown in FIG. 5.

Figure 4:
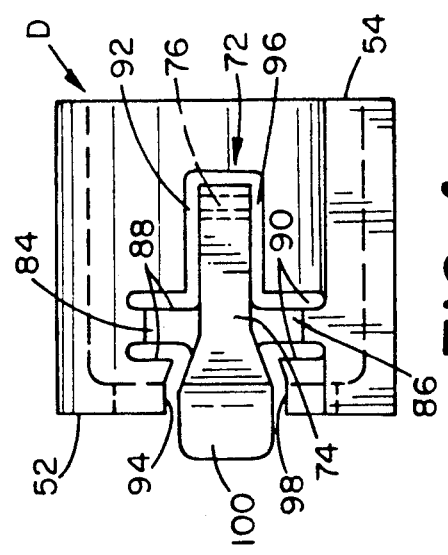
FIG. 4 is a top plan view of the coupling sleeve of FIG. 3.

As is most apparent in FIG. 4, the release button extends axially beyond the end 52 of the sleeve. Preferably the actuating portion also has a substantially larger lateral or circumferential dimension than the remainder of the latching member. This provides sufficient surface area to accommodate an operator's fingers to effectively depress the release buttons and move the latching tabs outward.

Figure 6:
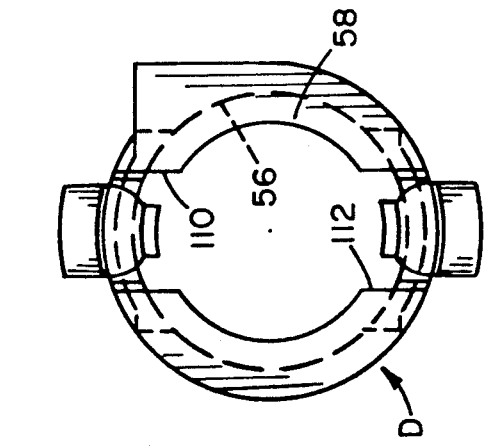
FIG. 6 is an end elevational view taken from the left-hand side of FIG. 5.
Figure 8:
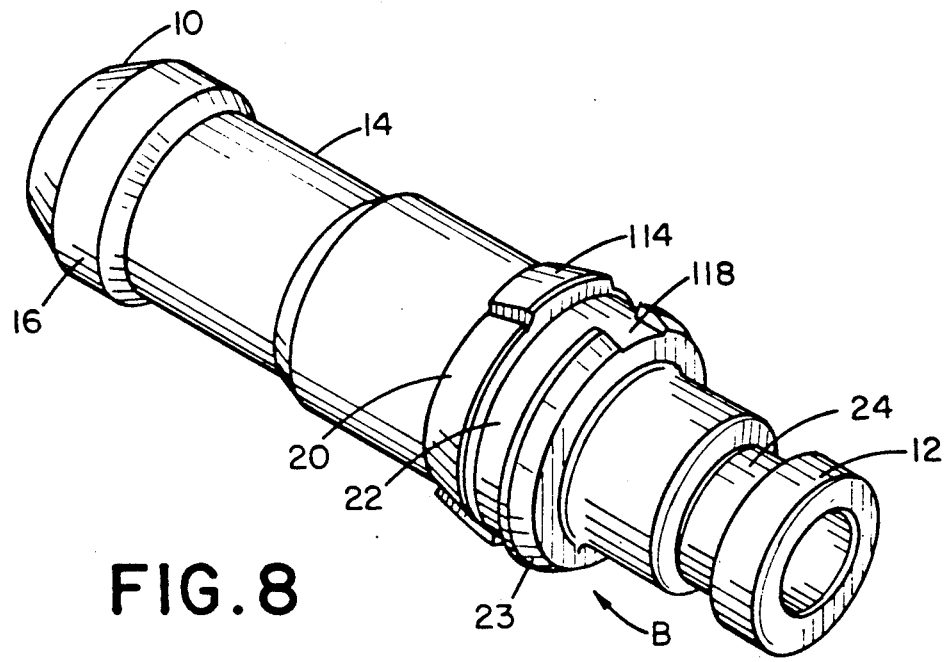
FIG. 8 is a perspective view of the male coupling member.
Figure 9:
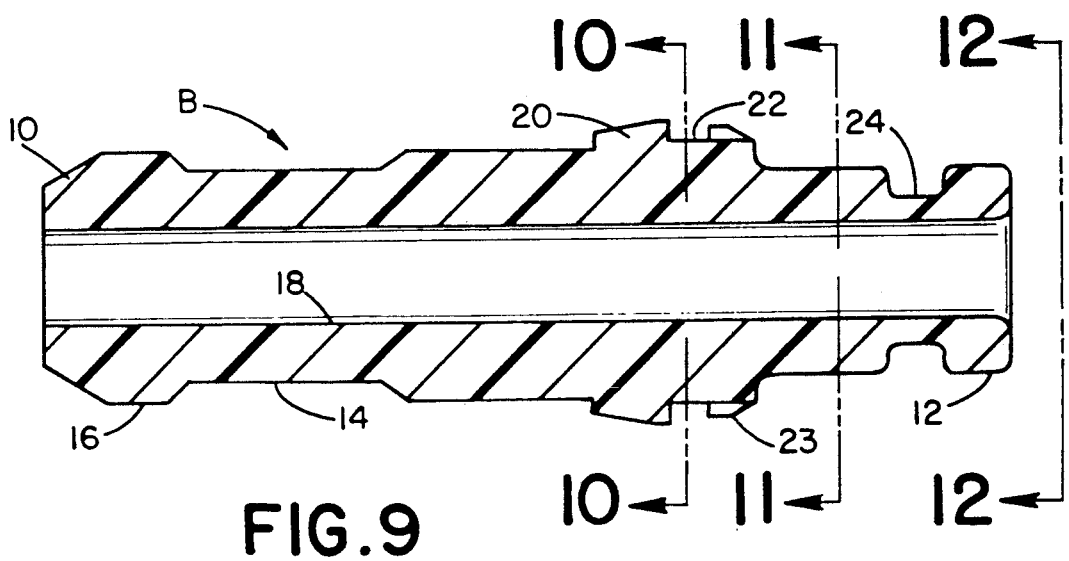
FIG. 9 is a longitudinal cross-sectional view of the male coupling member.
Figures 10, 11, 12:
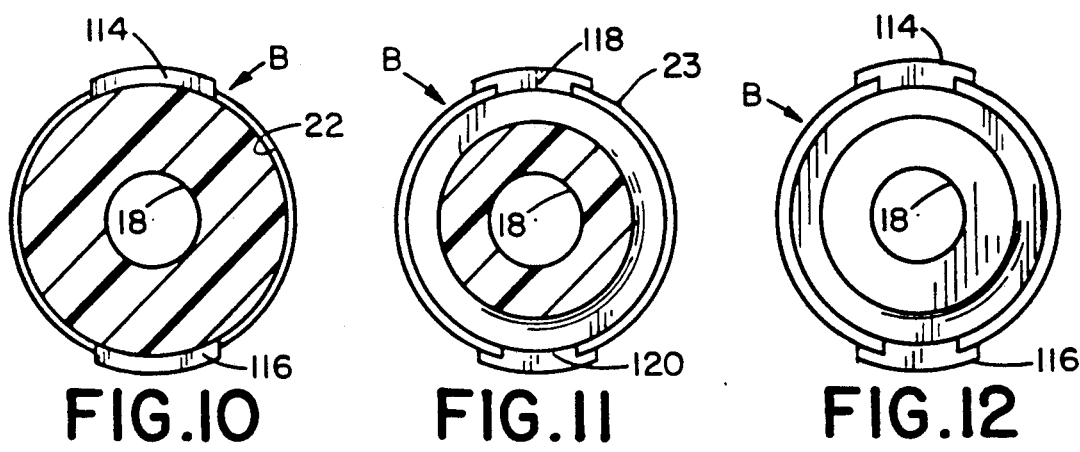
FIG. 10 is a cross-sectional view taken generally along the lines 10—10 of FIG. 9.
FIG. 11 is a cross-sectional view taken generally along the lines 11—11 of FIG. 9.
FIG. 12 is an end view of the male coupling member taken generally along the lines 12—12 of FIG. 9.

As best shown in FIGS. 6 and 7, the shoulder 58 of the sleeve is circumferentially interrupted at diametrically opposite regions 110, 112. These regions cooperate with keyed portions 114, 116 defined by radial flanges on the male coupling member (FIGS. 8 and 10). The lateral or circumferential dimension of these keyed portions is slightly less than the circumferential extent of the regions 110, 112. Thus, when the coupling sleeve is placed over the first end 10 of the male coupling and advanced toward the second end 12, the keyed portions 114, 116 and regions 110, 112 must be aligned to force the sleeve over shoulder 20 of the male coupling member.

Circumferential recesses 118, 120 are also preferably provided on the male coupling member as illustrated in FIG. 11. The recesses permit the latching members 72, 72', particularly the latching tabs 76, 76', to advance axially past shoulder 25 during assembly of the coupling sleeve over the shoulder 20. Once the coupling sleeve shoulder 58 is received in groove 22, the sleeve is free to rotate relative to the male coupling member and is axially retained between shoulders 22 and 23.

The invention has been described with reference to the preferred embodiment. Obviously modifications and alterations will occur to others upon a reading and understanding of the specification. It is intended to include all such modifications and alterations insofar as they come within the scope of the appended claims or the equivalents thereof.

Having thus described the invention, it is now claimed:

1. A coupling assembly for selectively coupling first and second fluid lines together, the coupling assembly comprising:

a male coupling member adapted to be connected to a first fluid line at one end and having a circumferential groove defined on an external surface;

a female coupling member adapted to be selectively connected to a second fluid line at one end and having a circumferential groove defined on an external surface, the female coupling member being selectively connected and disconnected to the male coupling member;

a cylindrical sleeve member being substantially circumferentially continuous at one end thereof, a radially inward extending shoulder being defined at the other end adapted for receipt in one of the grooves defined on the male and female members, the sleeve including a latching member having an intermediate central portion and first and second ends, said latching member having a locking tab at said second end adapted for selective receipt in the other one of the grooves of the male and female members when the shoulder is received in the one groove, the latching member having means for securing the latching member to the sleeve and pivoting said first and second ends thereof about said intermediate central portion by depressing an actuating portion defined at the first end of the latching member.

2. The coupling assembly as defined in claim 1 further comprising longitudinal slots in said cylindrical sleeve extending on opposite axial ends of the central portion that allow the first and second ends of the latching member to pivot relative to the sleeve.

3. The coupling assembly as defined in claim 1 further comprising circumferential slots in said cylindrical sleeve extending on opposite lateral sides of the central portion and defining circumferential strips that allow the pivoting action of the latching member.

4. The coupling assembly as defined in claim 1 further comprising longitudinal slots in said cylindrical sleeve extending on opposite axial ends of the central portion of the latching member and circumferential slots in said cylindrical sleeve extending on opposite lateral sides of the central portion and defining circumferential strips that are placed under a twisting load as the latching member pivots.

5. The coupling assembly as defined in claim 4 wherein the longitudinal and circumferential slots intersect adjacent said intermediate central portion of the latching member.

6. The coupling assembly as defined in claim 1 wherein said latching member actuating portion extends axially beyond the sleeve.

7. The coupling assembly as defined in claim 1 wherein the latching member has a substantially greater radial dimension than the remainder of the sleeve to which it is secured to provide increased mass and rigidity to the latching member.

8. The coupling assembly as defined in claim 1 further comprising a seal member received on an external portion of the male member for sealing engagement with the female member when disposed in coupled relation.

9. The coupling assembly as defined in claim 1 wherein the sleeve is formed entirely of a plastic material.

10. A coupling assembly adapted to connect first and second associated fluid lines together, the coupling assembly comprising:

male and female coupling members adapted for connection with the associated fluid lines and selective coupled engagement with one another, the coupling members each including an external groove;

a substantially circumferentially continuous sleeve having an opening therethrough and including means for fixedly securing the sleeve to one of the male and female coupling members and adapted to be selectively secured to the other of the coupling members, the sleeve being formed entirely from a plastics material and having an integral latching means for locking the coupling members together the latching means including a latching member having opposite ends and a central portion, said locking tab at one end that extends radially inward into and through the sleeve in a first position for locking engagement with the other of the coupling members and is movable to a second, radially outer position by pivoting the latching member about a central portion through radial movement of an actuating portion defined at the end opposite said one end of the latching member, the central portion being adapted for pivoting action through use of longitudinally and circumferentially extending pairs of slots in said sleeve adjacent the latching member that intersect adjacent the central portion of the sleeve and placing circumferential strips interposed between the circumferential slots under twisting forces when the locking tab is urged toward the second position.

11. The coupling assembly as defined in claim 10 wherein the securing means includes a radially inward extending shoulder disposed at an axially opposite end of the sleeve from the locking tab, the shoulder having a reduced diameter relative to the sleeve opening for securing the sleeve to one of the male and female members.

12. The coupling assembly as defined in claim 10 wherein the latching member includes means for reinforcing same.

13. The coupling assembly as defined in claim 10 wherein the actuating portion of the latching member has a substantially larger circumferential dimension than the locking tab.

14. The coupling assembly as defined in claim 10 wherein the latching member is attached to the sleeve along a circumferential strip that is perpendicular to the axial extent of the latching member.

15. The coupling assembly as defined in claim 10 wherein the latching means includes a second member diametrically opposed on the sleeve from the first latching member.

16. The coupling assembly as defined in claim 10 further comprising means for keying the coupling sleeve and the male coupling member together during assembly.

17. The coupling assembly as defined in claim 16 wherein the securing means includes means for locking the coupling sleeve against axial movement and permitting rotational movement relative to the male coupling member.

* * * * *